US010402662B2

(12) United States Patent
Kozicz et al.

(10) Patent No.: US 10,402,662 B2
(45) Date of Patent: *Sep. 3, 2019

(54) COMPUTER VISION COLLISION AVOIDANCE IN DRILLING OPERATIONS

(71) Applicant: Transocean Sedco Forex Ventures Limited, George Town Grand Cayman (KY)

(72) Inventors: John Kozicz, Spring, TX (US); Trenton Martin, Kingwood, TX (US)

(73) Assignee: Transocean Sedco Forex Ventures Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/186,095

(22) Filed: Jun. 17, 2016

(65) Prior Publication Data
US 2016/0292513 A1  Oct. 6, 2016

Related U.S. Application Data

(63) Continuation of application No. 14/284,196, filed on May 21, 2014, now Pat. No. 9,396,398.

(Continued)

(51) Int. Cl.
*E21B 19/00* (2006.01)
*E21B 41/00* (2006.01)
(Continued)

(52) U.S. Cl.
CPC .......... *G06K 9/00771* (2013.01); *E21B 19/00* (2013.01); *E21B 41/0021* (2013.01);
(Continued)

(58) Field of Classification Search
None
See application file for complete search history.

(56) References Cited

U.S. PATENT DOCUMENTS 5,751,927 A * 5/1998 Wason ................ G06F 3/04815
345/419
6,430,997 B1 * 8/2002 French ............... A63B 24/0003
73/379.04

(Continued)

FOREIGN PATENT DOCUMENTS

WO   2011036414 A1   3/2011
WO   2011123741 A2   10/2011

OTHER PUBLICATIONS

J Ye and Ka Hua, "Exploiting Depth Camera for 3D Spatial Relationship Interpretation," MMSys 2013 Conference, Feb. 26-Mar. 1, 2013, Oslo, Norway, pp. 151-161.

(Continued)

*Primary Examiner* — Soo Shin (57) ABSTRACT

A system and method for automatically preventing a collision between objects is described. One or more images of a working space may be collected, and a first object may be identified based on the one or more images. Three-dimensional coordinates of the first object may be determined, and a virtual boundary enclosing the identified first object in a three-dimensional coordinate system may be generated based on the three-dimensional coordinates of the first object, wherein the virtual boundary specifies a volume in the working space that a second object in the working space should not occupy. The coordinates in the three-dimensional coordinate system corresponding to the generated virtual boundary may be transmitted to a second processor, and the second processor may control the second object to perform an operation in the working space that includes the first object without contacting the virtual boundary of the first object.

26 Claims, 5 Drawing Sheets

Related U.S. Application Data (60) Provisional application No. 61/825,898, filed on May 21, 2013.

(51) Int. Cl.
| | | |
|---|---|---|
| *F16P 3/14* | (2006.01) | |
| *G06K 9/00* | (2006.01) | |
| *G06K 9/32* | (2006.01) | |
| *G06T 19/00* | (2011.01) | |

(52) U.S. Cl.
CPC .......... *F16P 3/142* (2013.01); *G06K 9/00369* (2013.01); *G06K 9/3241* (2013.01); *G06T 19/00* (2013.01); *G06T 2210/12* (2013.01); *G06T 2210/21* (2013.01)

(56) References Cited

U.S. PATENT DOCUMENTS

| | | | | |
|---|---|---|---|---|
| 7,084,867 B1* | 8/2006 | Ho | ............... | G06F 3/016 345/419 |
| 9,396,398 B2 | 7/2016 | Kozicz et al. | | |
| 2007/0028119 A1* | 2/2007 | Mirho | ............... | G07C 9/00087 713/189 |
| 2008/0239076 A1* | 10/2008 | Luo | ............... | G06K 9/00798 348/148 |
| 2010/0245372 A1* | 9/2010 | Gedik | ............... | G06T 3/4007 345/581 |
| 2012/0123563 A1* | 5/2012 | Drinkard | ............... | F16P 3/144 700/13 |
| 2014/0107971 A1* | 4/2014 | Engedal | ............... | B66C 13/02 702/150 |

OTHER PUBLICATIONS

Lee et al. "Monitoring Activities from Multiple Video Streams: Establishing a Common Coordinate Frame," IEEE Transactions on Pattern Analysis and Machine Intelligence, vol. 22, No. 8, Aug. 2000.

Supplementary European Search Report issued by the European Patent Office for Application No. 14801676.9, dated Mar. 27, 2017, 10 pages.

Communication issued by the European Patent Office for Application No. 14801676.9, dated Jul. 16, 2018, received Aug. 14, 2018, 6 pages.

International Search Report and Written Opinion issued by the International Searching Authority for Application No. PCT/US2014/039019, dated Sep. 24, 2014, 6 pages.

Summons to Attend Oral Hearing issued by the European Patent Office for Application No. 14801676.9, dated Apr. 25, 2019, 8 pages.

* cited by examiner

COMPUTER VISION COLLISION AVOIDANCE IN DRILLING OPERATIONS

CROSS REFERENCE TO RELATED APPLICATION

This application is a continuation of U.S. patent application Ser. No. 14/284,196 to Kozicz et al. entitled "Computer Vision Collision Avoidance in Drilling Operations" filed on May 21, 2014, which claims the benefit of priority of provisional Patent Application No. 61/825,898, filed on May 21, 2013, the entire contents of both of which are incorporated herein by reference.

TECHNICAL FIELD

The instant disclosure relates to control systems in drilling operations. More specifically, this disclosure relates to a computer vision collision avoidance system in drilling operations.

BACKGROUND

Oil and gas drilling operations have evolved over the years to include multiple automated tool subsystems. Automated tool subsystems aid in executing repetitive tasks on the drill floor including drilling, tripping, casing, and cementing. Tool automation optimizes the rate of penetration, makes hole quality more consistent, reduces operation time, improves overall drilling performance, and reduces the cost of drilling operations. More importantly, tool automation reduces the number of people required to work in and around the hazardous drill floor environment. The overwhelming majority of drilling operations are not fully automated, therefore some tasks are still performed by humans working alongside heavy drilling machinery. The automated tool subsystems pose new challenges for maintaining a safe operating environment where man and machine must share the same workspace.

Collision avoidance is a component of automated tool subsystems that mitigates the possibility of two or more of these tools colliding with each other. The systems that attempt to mitigate tool collision are known by various names: anti-collision systems (ACS), collision avoidance systems (CAS), zone management systems (ZMS), but all share a common goal. In some tool collision avoidance applications, virtual and real world (Cartesian) coordinate systems are correlated and define the drill floor space. A bounding box surrounds a tool in virtual space and establishes a volume occupied by the tool. The bounding box may also be axis-aligned, in which case the virtual space surrounding the tool changes dynamically as the tool appendages extend, rotate, retract, raise, lower, etc. A proximity zone surrounds the bounding box and defines a hazardous area around the tool. Collision avoidance systems monitor tool positions and movement, and predict a location of a moving tool. Collision avoidance systems will override automated tool operations to prevent a virtual overlap of the projected bounding boxes, i.e. a real-world tool collision.

Despite the move towards automated tool subsystems, drill hands continue to be a necessary component of the drilling operation. Drill floor personnel are a dynamic component of the drilling operation that are not monitored by existing tool collision avoidance systems. Collision avoidance between drill floor personnel and automated tools depends on the situational awareness of the rig hands (i.e., drill floor personnel). The avoidance of an automated tool presents an unnecessary distraction to a drill hand in an already hazardous environment.

BRIEF SUMMARY

Collisions between tools and floor personnel may be mitigated with an automated collision avoidance system that visually tracks drill floor personnel and tools, and controls the tools based on the visual tracking to ensure that the tools operate without colliding with drill floor personnel. In addition, an automated visual collision avoidance system may improve conventional collision avoidance systems by adding another degree of freedom for the tracking and control of the tools based on visual information of the drill floor.

According to one embodiment, a method may include collecting, with one or more image capturing devices, one or more images of a working space, and identifying, with a first processor, a first object based, at least in part, on the one or more images. The method may also include determining, with the first processor, coordinates of the first object based, at least in part, on the one or more images, wherein the determined coordinates of the first object are coordinates in a three-dimensional coordinate system. The method may further include generating, with the first processor, a virtual boundary enclosing the identified first object in the three-dimensional coordinate system based, at least in part, on the determined coordinates of the first object, wherein the virtual boundary specifies a volume in the working space that a second object in the working space should not occupy. The method may also include transmitting, with the first processor, to a second processor, coordinates in the three-dimensional coordinate system corresponding to the generated virtual boundary, wherein the second processor controls the second object to perform an operation in the working space that includes the first object without contacting the virtual boundary of the first object.

According to another embodiment, a system may include one or more image capturing devices configured to collect one or more images of a working space. The system may also include a first processor configured to receive the one or more images and to perform the steps of identifying a first object based, at least in part, on the one or more images, and determining coordinates of the first object based, at least in part, on the one or more images, wherein the determined coordinates of the first object are coordinates in a three-dimensional coordinate system. The first processor may also be configured to perform the step of generating a virtual boundary enclosing the identified first object in the three-dimensional coordinate system based, at least in part, on the determined coordinates of the first object, wherein the virtual boundary specifies a volume in the working space that a second object in the working space should not occupy. The first processor may also be configured to perform the step of transmitting, to a second processor, coordinates in the three-dimensional coordinate system corresponding to the generated virtual boundary, wherein the second processor controls the second object to perform an operation in the working space that includes the first object without contacting the virtual boundary of the first object.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
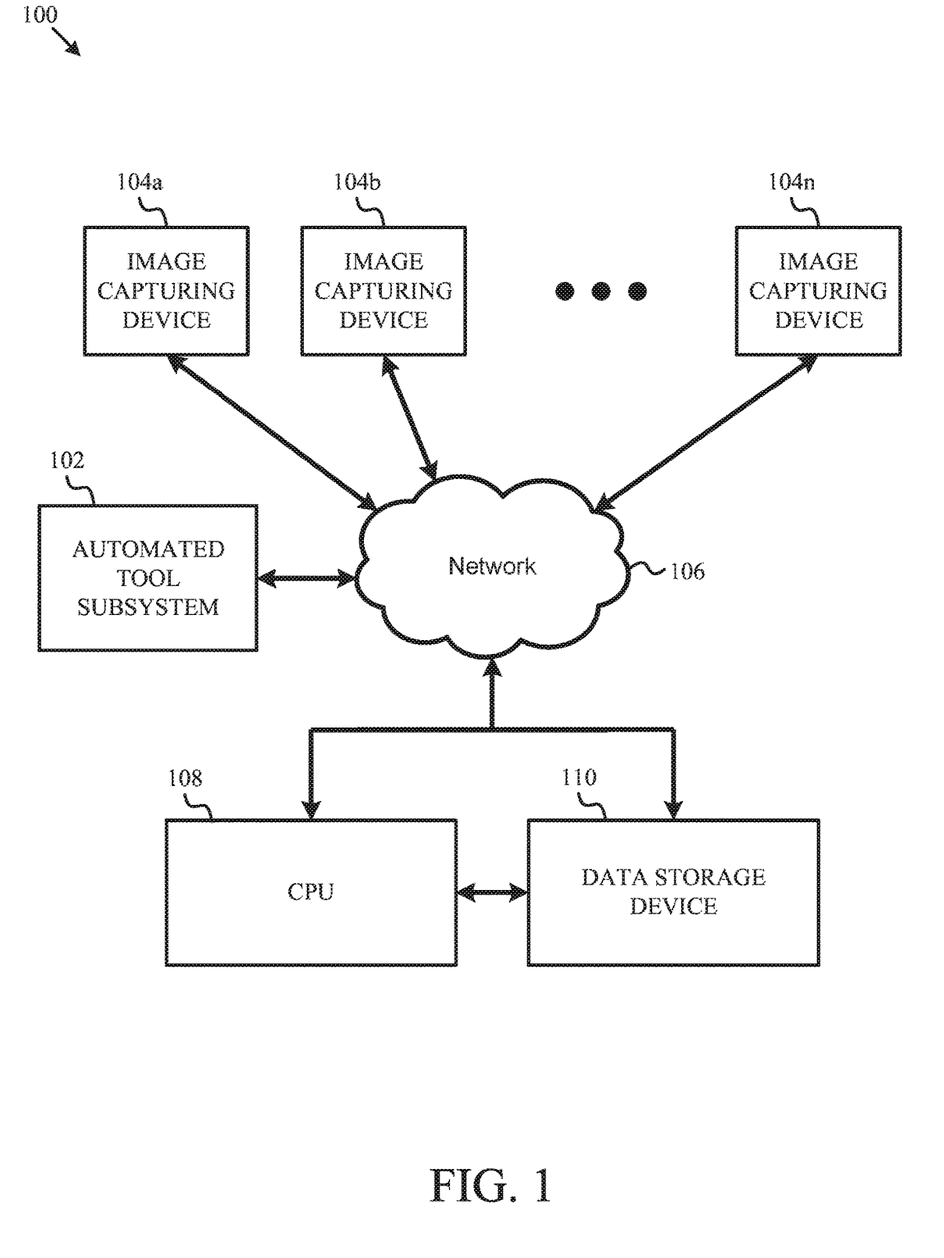
FIG. 1 is a schematic block diagram illustrating a computer vision collision avoidance system according to one embodiment of the disclosure.

FIG. 1 is a schematic block diagram illustrating a computer vision collision avoidance system according to one embodiment of the disclosure. A computer vision collision avoidance system 100 may include an automated tool subsystem 102, one or more image capturing devices 104a-104n, a network 106, a central processing unit (CPU) 108, and a data storage device 110. In some embodiments, the automated tool subsystem 102 may implement collision avoidance. For example, the automated tool subsystem 102 may include one or more processors to control one or more tools on a drill floor in order to prevent the one or more tools on the drill floor from colliding with one another.

According to an embodiment, the one or more image capturing devices 104a-104n may be configured to capture one or more images of a working space. In some embodiments, an image capturing device, such as any one or more of image capturing devices 104a-104n, may be a still image capturing device, such as a camera, a video capturing device, such as a video camera, or both a still image and video capturing device. For example, in some embodiments, one or more cameras with real time composite video feeds, such as closed-circuit television (CCTV) cameras, may be positioned around the working space to serve as the one or more image capturing devices and to collect the one or more images.

The network 106 may facilitate communications of data between the automated tool subsystem 102, one or more image capturing devices 104a-104n, the CPU 108, and the data storage device 110. The network 106 may include any type of communications network including, but not limited to, a direct component-to-component connection, a local area network (LAN), a wide area network (WAN), a modem-to-modem connection, the Internet, a wired data bus, a combination of the above, or any other communications network now known or later developed within the networking arts which permits two or more components to communicate.

The CPU 108 may be a general purpose CPU or microprocessor, graphics processing unit (GPU), and/or microcontroller. The embodiments of the disclosure are not restricted by the architecture of CPU 108, as long as CPU 108 supports the modules, configurations, various logical instructions, and/or operations as described herein. According to some embodiments, CPU 108 may be configured to at least: identify a first object based, at least in part, on the one or more images; determine coordinates of the first object based, at least in part, on the one or more images, wherein the determined coordinates of the first object are coordinates in a three-dimensional coordinate system; generate a virtual boundary enclosing the identified first object in the three-dimensional coordinate system based, at least in part, on the determined coordinates of the first object, wherein the virtual boundary specifies a volume in the working space that a second object in the working space should not occupy; and transmit, to a second processor, coordinates in the three-dimensional coordinate system corresponding to the generated virtual boundary, wherein the second processor controls the second object to perform an operation in the working space that includes the first object without contacting the virtual boundary of the first object. According to one embodiment, CPU 108 may execute machine-level instructions according to the exemplary operations described below.

The data storage device 110 may include one or more of a hard drive, a solid state storage device, a flash drive, a compact disc (CD) drive, a floppy disk drive, and a tape drive, a combination of the above, or any other storage means now known or later developed within the data storing arts which permits the storage of data. In general, the data storage device 110 may be used to store the various data used within system 100, such as images captured with image capturing devices 104a-104n, software and logical operations, such as, for example, code to execute the methods disclosed in method 200 below, to be executed by CPU 108, and any other information and/or data disclosed herein. According to one embodiment, the CPU 108 and data storage device 110 may be housed within a single enclosure or may be housed separately. In some embodiments, the data storage device 110 may include random access memory (RAM), which may be synchronous RAM (SRAM), dynamic RAM (DRAM), synchronous dynamic RAM (SDRAM), or the like. The data storage device 110 may utilize RAM to store the various data used by CPU 108. The data storage device 110 may also include read only memory (ROM) which may be PROM, EPROM, EEPROM, optical storage, or the like. The RAM and the ROM may each hold data for the computer vision collision avoidance system 100, and both the RAM and the ROM may be randomly accessed.

The processors, automated tool subsystems, image capturing devices, data storage devices, and network communication systems described above may include the processors, automated tool subsystems, image capturing devices, data storage devices, and network communication systems described below with respect to FIGS. 2-5. While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details or interrelationships between embodiments.

The present embodiments are not limited to the architecture of system 100. Rather, system 100 is provided as an example of one type of system that may be configured to perform the functions of a computer vision collision avoidance system. For example, any suitable processor-based device may be utilized to perform the functions of CPU 108 including without limitation, PDAs, smart phones, the image capturing devices 104a-104n, and multi-processor servers. Moreover, the present embodiments may be implemented on application specific integrated circuits (ASIC) or very large scale integrated (VLSI) circuits. In fact, persons of ordinary skill in the art may utilize any number of suitable structures capable of executing logical operations according to the described embodiments.

In view of exemplary systems shown and described herein, methodologies that may be implemented in accordance with the disclosed subject matter will be better understood with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, or component). Additionally, the methodologies disclosed throughout this specification are capable of being embodied, for example in computer program code, stored on an article of manufacture, such as a non-transitory computer readable medium, to facilitate transporting and transferring such methodologies to various devices. The methodologies described herein could alternatively be represented as a series of interrelated states or events, such as in a state diagram.

Figure 2:
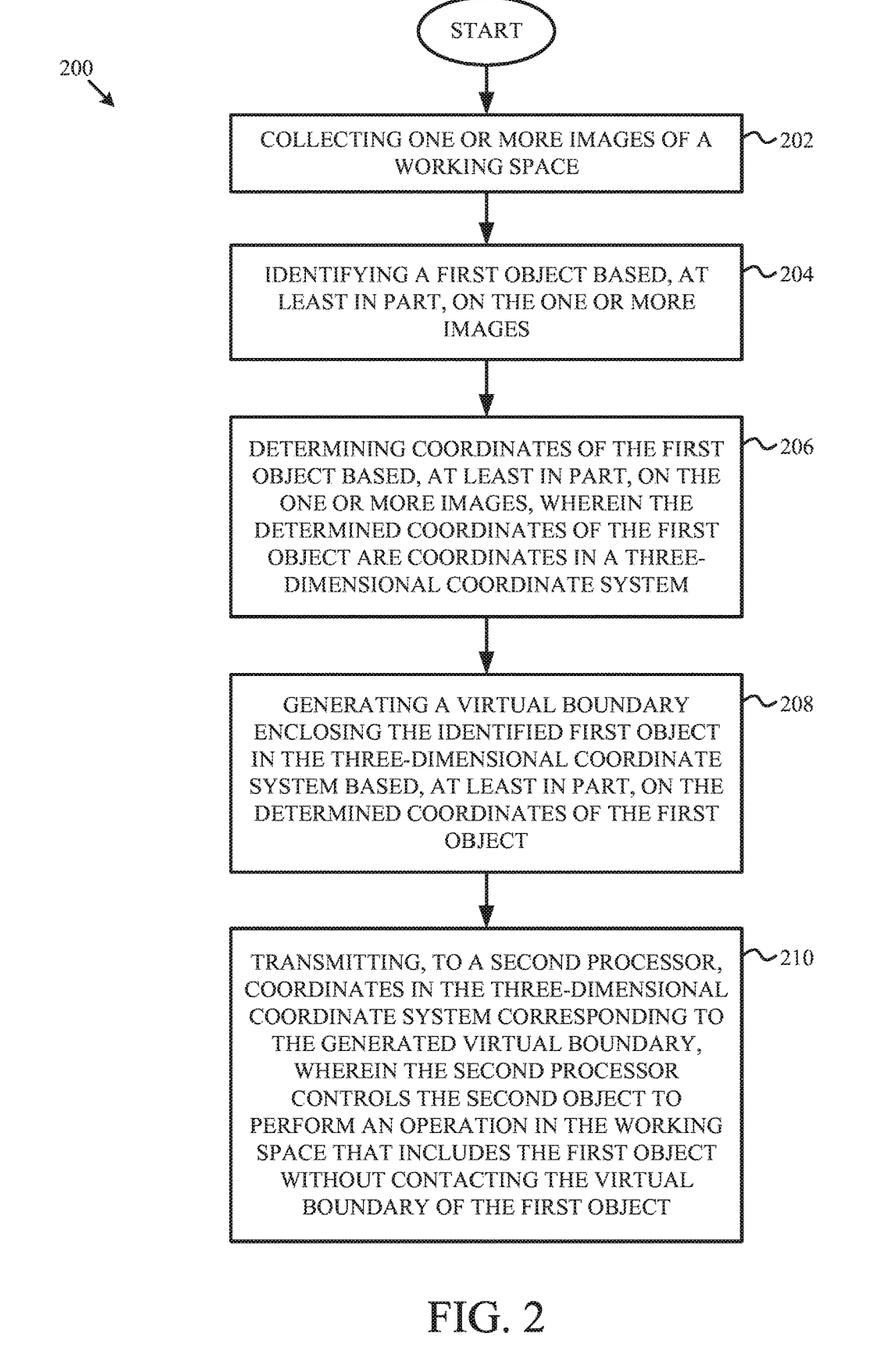
FIG. 2 is a flow chart illustrating a method for automatically preventing a collision between objects according to one embodiment of the disclosure.

FIG. 2 is a flow chart illustrating a method 200 for automatically preventing a collision between objects according to one embodiment of the disclosure. A method 200 begins at block 202 with collecting one or more images of a working space. The one or more images may be collected with one or more image capturing devices, such as image capturing devices 104a-104n illustrated in FIG. 1. In some embodiments, the working space may include a drill floor with a plurality of humans and/or tools located in the working space.

Method 200 further includes, at block 204, identifying a first object based, at least in part, on the one or more images. For example, in some embodiments, the first object may be identified based on analysis performed by CPU 108 illustrated in FIG. 1. According to one embodiment, images captured with the one or more image capturing devices may be communicated, for example via network 106, to a processor, such as CPU 108, for processing by the processor to identify at least one object in the images. The images captured with the one or more image capturing devices may also be communicated, for example via network 106, to a data storage device, such as data storage device 110, for storage in the data storage device. In some embodiments, multiple objects may be present in the captured images of the working space, and the processor may be configured to identify one or more of the objects in the working space. According to one embodiment, an identified object may be a human or a tool.

In some embodiments, the first object may also be identified based on a priori information, such as, for example, information about individuals or tools previously identified on the drill floor. In addition to the one or more images, the a priori information may also be stored in the data storage device.

In some embodiments, the processor may utilize computer vision analysis combined with image processing to identify an object in a video frame image captured by the image capturing devices. In computer vision, visual images may be acquired and processed to generate an electronic signal that can be analyzed and visually perceived. Computer vision may include both low-level and high-level capabilities. Low-level capabilities may include observatory detections, such as object perception, facial or general feature recognition, and/or detection of lightness, color, and range. High-level capabilities may include elaborate tasks that process large amounts of data to provide meaningful information, such as, for example, cognitive processes, geometric models, and/or statistical analyses. Computer vision integrates the low-level observations and high-level processing to extract information from images and provide a useful digital representation of the visual realm.

Figure 3:
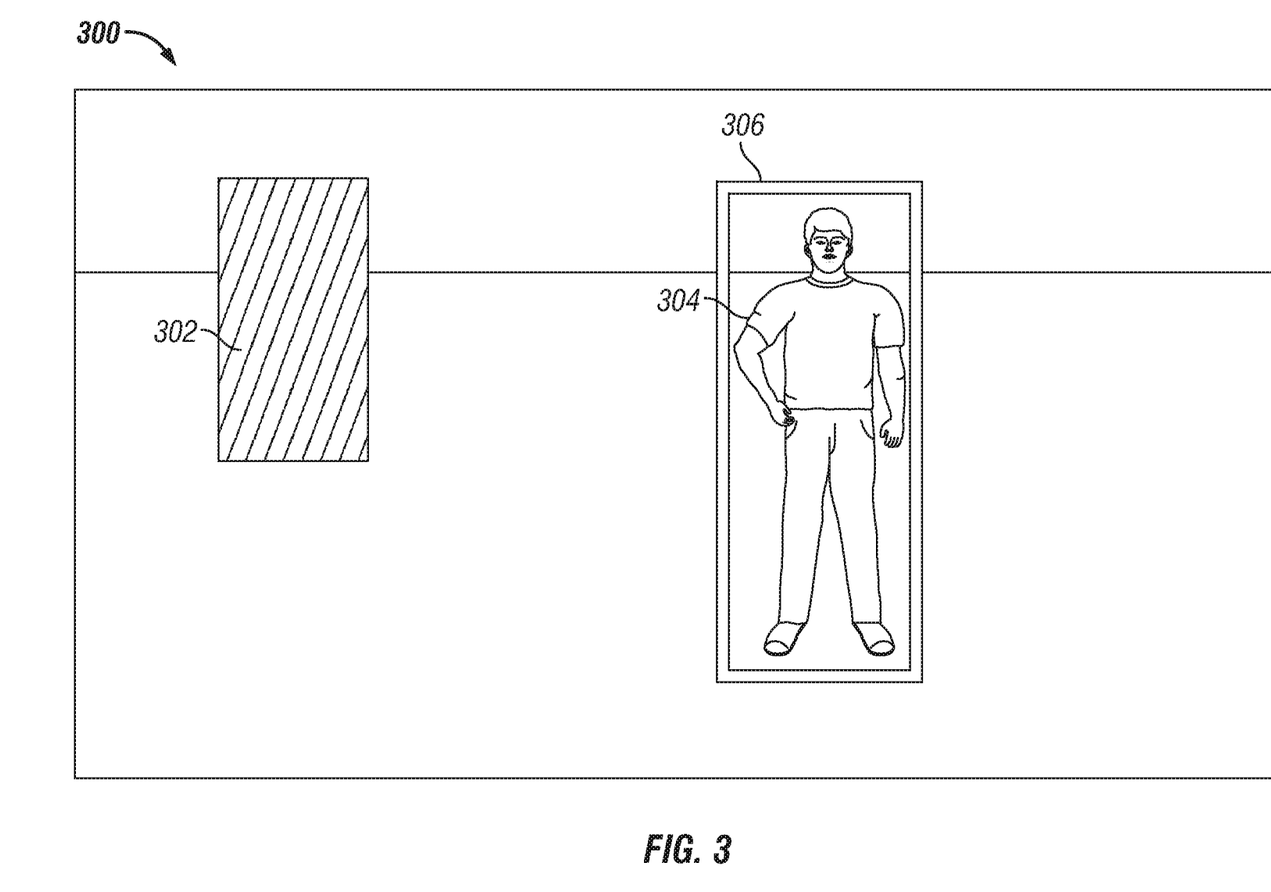
FIG. 3 is a diagram illustrating a projected tool bounding box and a bounding box projected over an identified person in a video image frame according to one embodiment of the disclosure.

According to an embodiment, computer vision, based on a real-time video feed of the working space, may be applied to a collision avoidance system in drilling operations to identify and track an individual and obtain an electronic representation of the individual's location on the drill floor. For example, a plurality of CCTV cameras may be located around the drilling floor to provide continuous, real-time views of the drill floor working space. The CCTV camera signals may be transferred to a processing device and a memory device, such as CPU 108 and data storage device 110, respectively. The processing device may process the CCTV camera signals, either from the CCTV cameras or from the memory device, to generate a virtual drill floor working space that includes a spatial representation of drill floor personnel and tools within the drill floor working space. For example, FIG. 3 provides an illustration of a virtual drill floor working space that includes spatial representation of an individual and a tool within the working space. As shown in FIG. 3, the working space 300 includes a tool, represented by its spatial bounding box 302, and an individual 304. Upon identifying the individual 304, computer vision processing may be performed by a processing device to generate a bounding box 306 around the individual in the virtual drill floor working space. In addition, the virtual drill floor working space generated using computer vision may be capable of electronically representing, using the bounding box 302 for the tool and the bounding box 306 for the individual, the spatial relationship between a tool and an individual on the real world drill floor. In another embodiment, the virtual drill floor working space generated using computer vision may electronically represent the spatial relationship between a plurality of tools and/or individuals on the real world drill floor.

In some embodiments, the one or more image capturing devices may be calibrated to minimize errors that may lead to inaccurate representations of the spatial relationship between objects on the drill floor. Errors may include inaccurate tracking or loss of tracking resulting from movement/overlap of objects on the drill floor and radial and/or tangential distortion in the lens of the camera. According to one embodiment, a calibration matrix may be used to calibrate a camera. In general, a calibration matrix may extract intrinsic and extrinsic parameters of the camera. In some embodiments, the system may run a continuous calibration routine, or at minimum, a calibration quality control check. As an example, and not limitation, a calibration matrix, $K_i$, specific to an image capturing device is provided in Equation 1, wherein i=camera identifier, f=focal length of camera (mm), m=row/column pixel/mm scale, r,c=optical axis/image plane intersection (principal point), and s=skew factor.

$$K_i = \begin{vmatrix} f_i m_{ri} & s_i & r_{0i} \\ 0 & f_i m_{ci} & c_{0i} \\ 0 & 0 & 1 \end{vmatrix} \qquad \text{Equation 1}$$

Referring back to FIG. 2 after identifying an object, method 200 includes, at block 206, determining coordinates of the first object based, at least in part, on the one or more images. For example, a processor, such as CPU 108, may further process the images to determine the coordinates of the objects upon identifying one or more objects in one or more images captured of the working space. According to an embodiment, the one or more collected images of a working space may be collected with one or more image capturing devices, and the determined coordinates of the first object may be coordinates in a three-dimensional coordinate system.

Coordinates of an object identified in the one or more collected images may be determined by the processor based on the coordinate system associated with the one or more images. The coordinate system associated with the one or more images may be a three-dimensional coordinate system or may be a two-dimensional coordinate system. To determine the coordinates of an object in the working space, such as at block 106, when the coordinate system is a two-dimensional coordinate system, the coordinates of the object may be transformed by the processor from the two-dimensional coordinate system to a three-dimensional coordinate system.

At block 208, method 200 includes generating a virtual boundary enclosing the identified first object in the three-dimensional coordinate system based, at least in part, on the determined coordinates of the first object, wherein the virtual boundary specifies a volume in the working space that a second object in the working space should not occupy. In some embodiments, a processor, such as CPU 108, may generate the virtual boundary enclosing the identified object in the three-dimensional coordinate system upon determining the coordinates of the object in a three-dimensional coordinate system. For example, the projection of multiple two-dimensional images captured with one or more image capturing devices to a three-dimensional coordinate system may be used to generate the virtual boundary, also referred to herein as a "bounding box" or "cylinder" around the object.

Figure 4:
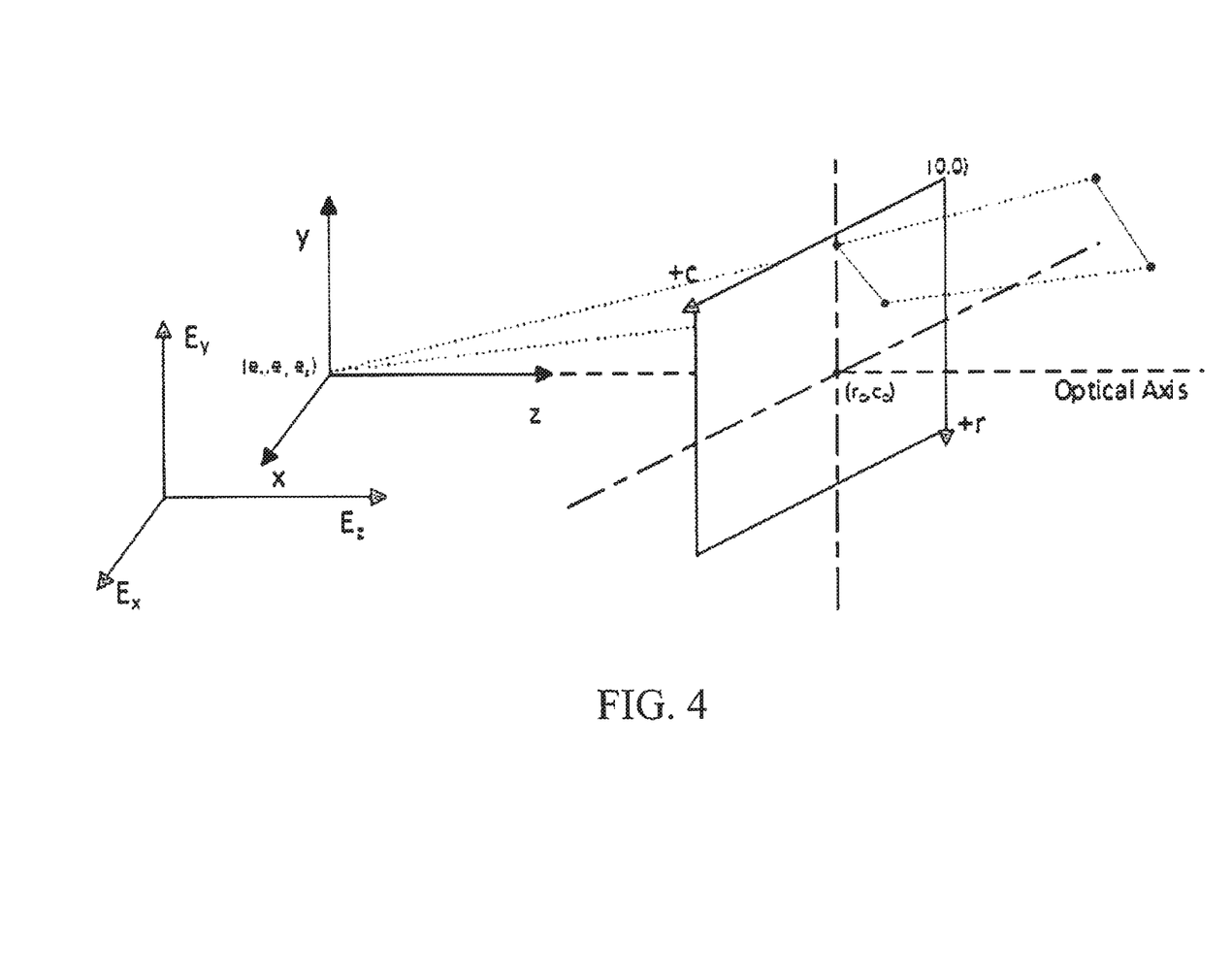
FIG. 4 is a diagram illustrating the camera ($e_x, e_y, e_z$), world ($E_x, E_y, E_z$), and image (r,c) coordinate frames according to one embodiment of the disclosure.

FIG. 4 provides a diagram illustrating camera ($e_x, e_y, e_z$), world ($E_x, E_y, E_z$), and image (r,c) coordinate frames according to one embodiment of the disclosure. According to the embodiment of FIG. 4, a box surrounding an object in an image may be specified by a processor with a two-dimensional box having image pixel coordinates (row, column). The lines comprising the box may be projected onto real world three-dimensional coordinates. By transferring multiple two-dimensional boxes to three-dimensional boxes so that the boxes may be projected onto real world three-dimensional coordinates, a processor may generate a virtual boundary enclosing the identified object in the three-dimensional real world coordinate system.

Figure 5:
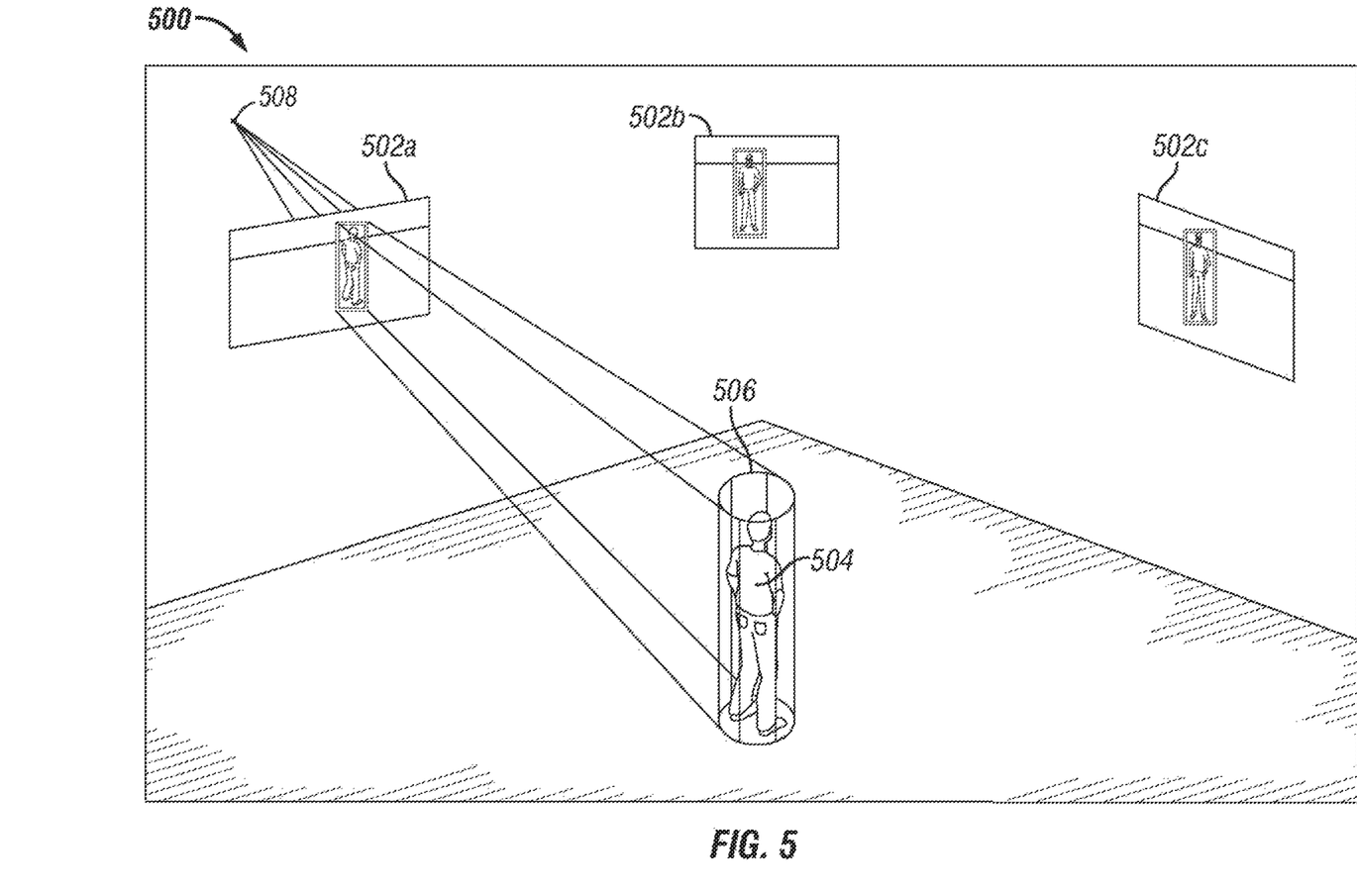
FIG. 5 is a diagram illustrating three two-dimensional images taken by three cameras and the resulting bounding cylinder projected over an individual following processing of the three two-dimensional images according to one embodiment of the disclosure.

FIG. 5 is a diagram illustrating three two-dimensional images 502a-502c taken by three cameras, and the resulting bounding cylinder projected over an individual following processing by a processor, such as CPU 108, of the three two-dimensional images 502a-502c according to one embodiment of the disclosure. Multiple cameras may be positioned at various locations on a drill floor working space 500 to create an over-determined solution for the bounding box 506 of an individual 504 in the working space 500. For example, image 502a is the image captured with a camera located at focal point 508. Images 502b-502c are examples of other images that may be captured with two other cameras positioned around the drill floor working space 500. Each camera may have a calibration matrix (K), camera center in world coordinates (e), and a camera orientation (R) value associated with it. The calibration matrix, camera orientation, and camera center in real world coordinates derived for the cameras may be used to calculate a projection matrix transform P for projecting a virtual two-dimensional enclosure into real world three-dimensional coordinates, which is shown in equation 2, wherein $P_i$ is the projection matrix transform, $K_i$ is the calibration matrix, $R_i$ is the Camera Orientation (rotation between camera and world coordinate frames), and $\vec{e}_i = (e_{xi}, e_{yi}, e_{zi})$ is the camera center in world coordinates and I is the identity matrix.

$$P_i = K_i R_i [I | -\vec{e}_i] \qquad \text{Equation 2}$$

Referring back to FIG. 2, method 200 includes, at block 210, transmitting, with the first processor, to a second processor, coordinates in the three-dimensional coordinate system corresponding to the generated virtual boundary, wherein the second processor controls the second object to perform an operation in the working space that includes the first object without contacting the virtual boundary of the first object. For example, according to one embodiment, after generating the virtual boundary for an object with a CPU, such as CPU 108, the CPU may transmit the coordinates corresponding to the generated virtual boundary to one or more processors, such as one or more processors of the automated tool subsystem 102, and the one or more processors may control one or more tools on the drill floor in order to prevent the one or more tools on the drill floor from colliding with one another or with a human on the drill floor. In some embodiments, in order to avoid colliding with an object the virtual boundary's static and dynamic extents corresponding to the object on the drill floor and generated by a first processor, such as CPU 108, may be transferred from the first processor to a collision avoidance system, such as automated tool subsystem 102, over a field-bus protocol, for example via network 106, and the collision avoidance system may, with a second processor, control tools on the drill floor such that they do not collide with the virtual boundary for the object. For example, the projected virtual boundaries for objects may provide the collision avoidance system with the real time positional information for object's. The collision avoidance system may then take into account the virtual boundary for the objects' positions and control one or more of the objects, such as the second object at block 110, to avoid a collision between the controlled object, such as the second object at block 110, and the other objects in the working space, such as an individual or other tool on the drill floor.

In some embodiments, the first processor, such as CPU 108, and the second processor, such as a processor of the automated tool subsystem 102, may be the same processor. For example, a processor of the automated tool subsystem 102 may also be configured to access images captured with the one or more image capturing devices 104a-104n and data in the data storage device 110 to at least: identify a first object based, at least in part, on the one or more images; determine coordinates of the first object based, at least in part, on the one or more images, wherein the determined coordinates of the first object are coordinates in a three-dimensional coordinate system; generate a virtual boundary enclosing the identified first object in the three-dimensional coordinate system based, at least in part, on the determined coordinates of the first object, wherein the virtual boundary specifies a volume in the working space that a second object in the working space should not occupy; and/or control the second object to perform an operation in the working space that includes the first object without contacting the virtual boundary of the first object. Therefore, in some embodiments, the speed with which a computer vision collision avoidance system 100 operates may be increased by removing latency associated with having separate processors perform separate operations of computer vision collision avoidance system 100.

In some embodiments, one or more objects in the working space may be moving, and the disclosed automated collision avoidance system utilizing computer vision may continuously monitor the working space to dynamically control moving objects in the working space to avoid collisions. For example, a real-time video feed from one or more video capturing devices may be used to dynamically monitor the working space in which at least one object is moving, and each of the actions performed at blocks 202-210 in FIG. 2 may be automatically repeated one or more times to mitigate collisions between the objects in the working space.

According to one embodiment in which the object identified in the working space is a human, a processor, such as CPU 108, may be used to identify a unique identity of the human based, at least in part, on the one or more images. For example, the computer vision collision avoidance system may employ a processor to perform feature recognition to identify an individual. The one or more images of the identified human may be compared with a plurality of stored images of humans, such as a plurality of images of humans stored in data storage device 110, until features corresponding to the identified human match features of a human in one of the plurality of stored images of humans. According to one embodiment, the features may be facial features or any other physical features unique to an individual. In some embodiments, the plurality of stored images may be stored in a memory database, such as data storage device 110, that is coupled, either wired or wirelessly via network 106, to a processor, such as CPU 108, of the computer vision collision avoidance system, such as system 100. According to one embodiment, whether or not the individual is authorized to be in the working space may be determined based on the identification of the individual.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising:
   collecting, with one or more image capturing devices, one or more images of a working space, wherein the working space includes an area with a plurality of objects and one or more tools;
   identifying, with a processor, a first object from the plurality of objects based at least in part on the one or more images;
   determining, with the processor, coordinates of the first object within the working space based at least in part on the one or more images, the determining including determining coordinates of the first object based on a two-dimensional coordinate system associated with the one or more images and transforming the coordinates of the first object from coordinates in a two-dimensional coordinate system associated with the one or more images to a three-dimensional coordinate system; and
   generating, with the processor, a virtual boundary enclosing the identified first object in the three-dimensional coordinate system based on the determined coordinates of the first object.

2. The method of claim 1, wherein the processor is a first processor, the method further comprising transmitting, with the first processor, to a second processor, coordinates in the three-dimensional coordinate system corresponding to the generated virtual boundary, wherein the second processor controls a second object to perform an operation in the working space that includes the first object without contacting the virtual boundary of the first object.

3. The method of claim 1, wherein the object is a human, the identifying including identifying an identity of the human based at least in part on comparing, with the processor, the one or more images with a plurality of stored images of humans.

4. The method of claim 3, wherein the comparing includes comparing physical features of the human in the one or more images with physical features in the plurality of stored images of humans.

5. The method of claim 3, further comprising determining with the processor whether the human is authorized to be in the working space based at least in part on the identity of the human.

6. The method of claim 1, wherein the one or more image capturing devices includes at least one of a still image capturing device and a video image capturing device.

7. The method of claim 1, wherein the working space includes a drill floor.

8. The method of claim 1, wherein the step of transforming the coordinates is based, at least in part, on a projection matrix associated with the one or more image capturing devices and a calibration matrix associated with the one or more image capturing devices.

9. The method of claim 1, further comprising identifying a second object from the plurality of objects based at least in part on the one or more images, determining coordinates of the second object within the working space based at least in part on the one or more images, generating a virtual boundary enclosing the identified second object, and detecting when the virtual boundary enclosing the identified first object overlaps at least in part the virtual boundary enclosing the identified second object.

10. The method of claim 1, wherein the generating includes generating the virtual boundary enclosing the identified first object in the three-dimensional coordinate system based on only the determined coordinates of the first object.

11. The method of claim 1, wherein the generating includes generating the virtual boundary enclosing the identified first object in the three-dimensional coordinate system based on the real-time video feed of the working space.

12. A system, comprising:
one or more image capturing devices configured to collect one or more images of a working space; and
a processor configured to receive the one or more images and to perform the steps of:
receiving, from the one or more image capturing devices, the one or more images of the working space, the working space including a drill floor with a plurality of humans and one or more tools located in the working space;
identifying, with the processor, a first object based at least in part on the one or more images, the identifying the first object including identifying that the first object is a human;
determining, with the processor, coordinates of the first object within the working space based at least in part on the one or more images, the determining including determining coordinates of the first object based on a two-dimensional coordinate system associated with the one or more images and transforming the coordinates of the first object from coordinates in a two-dimensional coordinate system associated with the one or more images to a three-dimensional coordinate system; and
generating, with the processor, a virtual boundary enclosing the identified first object in the three-dimensional coordinate system based on the determined coordinates of the first object.

13. The system of claim 12, wherein the processor is a first processor, the first processor being configured to transmit, to a second processor, coordinates in the three-dimensional coordinate system corresponding to the generated virtual boundary, the second processor being configured to control a second object to perform an operation in the working space that includes the first object without contacting the virtual boundary of the first object.

14. The system of claim 12, wherein identifying that the first object is a human includes identifying an identity of the human by comparing, with the processor, the one or more images with a plurality of stored images of humans.

15. The system of claim 14, wherein the comparing includes comparing physical features of the human in the one or more images with physical features in the plurality of stored images of humans.

16. The system of claim 14, wherein the processor is configured to determine whether the human is authorized to be in the working space based at least in part on the identity of the human.

17. The system of claim 12, wherein the step of transforming the coordinates is based, at least in part, on a projection matrix associated with the one or more image capturing devices and a calibration matrix associated with the one or more image capturing devices.

18. A non-transitory processor-readable medium storing code representing instructions to be executed by a processor, the code comprising code to cause the processor to:
collect one or more images of a working space that includes a drill floor within which a plurality of humans and one or more tools are located, the one or more images being captured by one or more image capturing devices configured to capture images of the working space;
identify-a first object based at least in part on the one or more images, the first object being a human;
identify an identity of the human based at least in part on the one or more images;
determine coordinates of the first object within the working space based at least in part on the one or more images and a two-dimensional coordinate system associated with the one or more images;
transform the coordinates of the first object from coordinates in a two-dimensional coordinate system associated with the one or more images to a three-dimensional coordinate system;
generate a virtual boundary enclosing the identified first object in the three-dimensional coordinate system based on the determined coordinates of the first object; and
determine whether the human is authorized to be in the working space based at least in part on the identity of the human.

19. The non-transitory processor-readable medium of claim 18, the code further comprising code to cause the processor to transmit, to a second processor, coordinates in the three-dimensional coordinate system corresponding to the generated virtual boundary, the second processor being configured to control a second object to perform an operation in the working space that includes the first object without contacting the virtual boundary of the first object.

20. The non-transitory processor-readable medium of claim 18, wherein the code to cause the processor to identify the identity of the human includes code to cause the processor to compare the one or more images with a plurality of stored images of humans.

21. A method, comprising:
collecting, with one or more image capturing devices, images of a working space, wherein the working space includes an area with a plurality of objects and one or more tools, and the images of the working space includes a first image and a second image;
identifying, with a processor, an object from the plurality of objects based at least in part on the images;
determining, with the processor, coordinates of the identified object within the working space based at least in part on the images, the determining including determining (1) first coordinates of the identified object based on a two-dimensional coordinate system associated with the first image and (2) second coordinates of the identified object based on a two-dimensional coordinate system associated with the second image, and transforming the first coordinates and the second coordinates into a matching coordinate system; and generating, with the processor, a virtual boundary surrounding the identified object in the matching coordinate system based on the determined coordinates of the identified object.

22. The method of claim 21, wherein the one or more image capturing devices includes one or more CCTV cameras.

23. The method of claim 21, further comprising:
generating, based at least in part on the images and the determined coordinates of the identified object, a virtual working space that includes a spatial representation of the identified object and at least one of the one or more tools.

24. The method of claim 21, wherein the identifying the object from the plurality of objects includes identifying the object as a human.

25. The method of claim 21, further comprising:
controlling, based on the determined coordinates of the identified object, at least one tool from the one or more tools, to avoid a collision with the identified object.

26. The method of claim 21, further comprising:
stopping, based on the determined coordinates of the identified object, at least one tool from the one or more tools, to avoid a collision with the identified object.

* * * * *

UNITED STATES PATENT AND TRADEMARK OFFICE
CERTIFICATE OF CORRECTION

PATENT NO. : 10,402,662 B2
APPLICATION NO. : 15/186095
DATED : September 3, 2019
INVENTOR(S) : John Kozicz et al.

Page 1 of 1

It is certified that error appears in the above-identified patent and that said Letters Patent is hereby corrected as shown below:

In the Claims

Column 12, Line 23 (Claim 18):
"identify-a first object based at least in part on the one or" should be – identify a first object based at least in part on the one or –

Signed and Sealed this
Twenty-fourth Day of March, 2020

Andrei Iancu
*Director of the United States Patent and Trademark Office*